US009671629B2

(12) United States Patent
Li et al.

(10) Patent No.: US 9,671,629 B2
(45) Date of Patent: Jun. 6, 2017

(54) DISPLAY DEVICE AND DISPLAY SYSTEM

(71) Applicant: BOE TECHNOLOGY GROUP CO., LTD., Beijing (CN)

(72) Inventors: Yunfei Li, Beijing (CN); Haoran Gao, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 14/374,747

(22) PCT Filed: Dec. 12, 2013

(86) PCT No.: PCT/CN2013/089306
§ 371 (c)(1),
(2) Date: Jul. 25, 2014

(87) PCT Pub. No.: WO2014/190728
PCT Pub. Date: Dec. 4, 2014

(65) Prior Publication Data

US 2015/0160492 A1 Jun. 11, 2015

(30) Foreign Application Priority Data

May 30, 2013 (CN) .......................... 2013 1 0210633

(51) Int. Cl.
*G09G 3/36* (2006.01)
*G02F 1/133* (2006.01)
(Continued)

(52) U.S. Cl.
CPC ...... *G02F 1/13306* (2013.01); *G02F 1/13363* (2013.01); *G02F 1/13439* (2013.01);
(Continued)

(58) Field of Classification Search
CPC ............... G02F 1/1347; G02F 1/13306; G02F 1/13363; G02F 1/13439; G02F 2203/50;
(Continued)

(56) References Cited

U.S. PATENT DOCUMENTS 6,028,656 A 2/2000 Buhrer et al.
8,885,123 B2 * 11/2014 Huang ................ G02B 27/225 349/100

(Continued)

FOREIGN PATENT DOCUMENTS

CN 1637515 A 7/2005
CN 101196633 A 6/2008

(Continued)

OTHER PUBLICATIONS

English Translation of the International Search Report of PCT/CN2013/089306 published in English on Dec. 4, 2014.

(Continued)

*Primary Examiner* — Kent Chang
*Assistant Examiner* — Mark Edwards
(74) *Attorney, Agent, or Firm* — Collard & Roe, P.C.

(57) ABSTRACT

A display device and display system are disclosed, and the display device comprises: a liquid crystal display (LCD) provided with a backlight and an LCD panel (1), a first quarter-wave phase retardation film (2) disposed on one side of the LCD panel (1) away from the backlight, and a first liquid crystal phase retardation plate (3) disposed on one side of the first quarter-wave phase retardation film (2) away from the LCD panel (1); the LCD emits first linearly polarized light for type I information and second linearly polarized light for type II information; and when a voltage is applied to the liquid crystal phase retardation plate (3), emergent light, passing through and emitted from the first quarter-wave phase retardation film and the first liquid (Continued)

crystal phase retardation plate, of the first linearly polarized light and the second linearly polarized light, is converted into overlapped light of circularly polarized light in different rotation directions. The display device makes naked eye personnel unable to identify effective image information, so that the confidential display effect can be greatly improved.

6 Claims, 4 Drawing Sheets

(51) Int. Cl.
*G02F 1/1347* (2006.01)
*G02F 1/1343* (2006.01)
*G02F 1/13363* (2006.01)

(52) U.S. Cl.
CPC .................... *G02F 1/13471* (2013.01); *G02F 2001/133638* (2013.01); *G02F 2203/50* (2013.01)

(58) Field of Classification Search
CPC ........ G02F 2001/133638; G02F 2001/133528; G02F 2001/133541
See application file for complete search history.

(56) References Cited

U.S. PATENT DOCUMENTS

| | | | | |
|---|---|---|---|---|
| 2002/0122145 | A1* | 9/2002 | Tung | G02B 27/2264 349/96 |
| 2003/0025667 | A1* | 2/2003 | Yerazunis | G06F 21/84 345/102 |
| 2005/0141710 | A1* | 6/2005 | Mashitani | G02B 27/2214 380/205 |
| 2008/0084521 | A1 | 4/2008 | Sugiyama et al. | |
| 2010/0060721 | A1 | 3/2010 | Chen et al. | |
| 2010/0321627 | A1* | 12/2010 | Koyanagi | G02B 5/3016 349/194 |
| 2014/0118643 | A1 | 5/2014 | Huang | |

FOREIGN PATENT DOCUMENTS

| | | | |
|---|---|---|---|
| CN | 101359099 | A | 2/2009 |
| CN | 101937147 | A | 1/2011 |
| CN | 201780433 | U | 3/2011 |
| CN | 102364385 | A | 2/2012 |
| CN | 103293757 | A | 9/2013 |
| EP | 0 438 817 | A1 | 7/1991 |
| JP | H03252626 | A | 11/1991 |

OTHER PUBLICATIONS

Chinese Office Action of Chinese Application No. 201310210633.0, mailed Feb. 13, 2015 with English translation.

International Search Report, International Preliminary Report on Patentability and Written Opinion of the International Searching Authority of PCT/CN2013/089306 in Chinese, mailed Dec. 12, 2013.

English translation of the International Preliminary Report on Patentability and Written Opinion of the International Searching Authority of PCT/CN2013/089306, issued Dec. 1, 2015.

* cited by examiner

DISPLAY DEVICE AND DISPLAY SYSTEM

CROSS REFERENCE TO RELATED APPLICATIONS

This application is the National Stage of PCT/CN2013/089306 filed on Dec. 12, 2013, which claims priority under 35 U.S.C. §119 of Chinese Application No. 201310210633.0 filed on May 30, 2013, the disclosure of which is incorporated by reference.

TECHNICAL FIELD

Embodiments of the present invention relate to a display device and a display system.

BACKGROUND

Among flat-panel display devices, thin-film transistor liquid crystal displays (TFT-LCDs) have dominated the current flat-panel display market due to the characteristics of small volume, low power consumption, relatively low manufacturing cost, non-radiation and the like.

The application of a liquid crystal display (LCD) to display confidential information is also gradually coming into sight. The confidential information must be kept confidential to certain groups and must also be viewed in certain situation. When the confidential information is viewed, if the groups who cannot view the confidential information are on the scene, the best confidential effect can be achieved by preferably making the groups unable to view the confidential information.

At present, a device for achieving confidential display has been provided by reduction of the viewing angle of the LCD. That is to say, the viewing angle of the LCD is set to be very small so that those who sit in front of the display can view contents on the display but those who sit around cannot view the contents on the display. However, such a confidential display device has certain defects, namely those who sit around can view the contents on the display if standing behind the viewer. Therefore, the confidential display device has a poor confidential effect.

SUMMARY

Embodiments of the present invention provide a display device and display system used for improving the confidential display effect.

One aspect of the present invention provides a display device, which comprises: an LCD provided with a backlight and an LCD panel, a first quarter-wave phase retardation film disposed on one side of the LCD panel away from the backlight, and a first liquid crystal phase retardation plate disposed on one side of the first quarter-wave phase retardation film away from the LCD panel. The first liquid crystal phase retardation plate includes two substrates and a liquid crystal layer disposed between the two substrates; one surface of each substrate facing the liquid crystal layer is provided with a transparent electrode layer; the LCD alternately emits second linearly polarized light of one frame of type II information and first linearly polarized light of one frame of type I information; the transparent electrode layer of each substrate of the first liquid crystal phase retardation plate is a planar electrode for covering a surface of the substrate; when the LCD emits the first linearly polarized light, a predetermined voltage signal is applied to the first liquid crystal phase retardation plate which is driven to convert emergent light, passing through and emitted from the first quarter-wave phase retardation film, of the first linearly polarized light into circularly polarized light in a first rotation direction; and when the LCD emits the second linearly polarized light, a voltage signal opposite to the predetermined voltage signal is applied to the first liquid crystal phase retardation plate which is driven to convert emergent light, passing through and emitted from the first quarter-wave phase retardation film, of the second linearly polarized light into circularly polarized light in a second rotation direction.

For instance, in the display device, patterns of the type I information and the type II information have close colors.

For instance, in the display device, the type I information may be a confidential pattern or a random mosaic pattern while correspondingly the type II information may be a random mosaic pattern or a confidential pattern.

In one aspect, the present invention provides a display system, which comprises any foregoing display device and an analyzer for analyzing the circularly polarized light in the first rotation direction.

For instance, the analyzer may include: a second liquid crystal phase retardation plate, a linear polarization sheet, a second quarter-wave phase retardation film disposed between the second liquid crystal phase retardation plate and the linear polarization sheet, and a control device; the linear polarization sheet is perpendicular to the polarization direction of the first linearly polarized light; the second liquid crystal phase retardation plate includes two substrates and a liquid crystal layer disposed between the two substrates; one surface of each substrate facing the liquid crystal layer is provided with a transparent electrode layer; the transparent electrode layer of each substrate of the second liquid crystal phase retardation plate is a planar electrode for covering a surface of the substrate; and the control device is in a signal communication with the LCD, the first liquid crystal phase retardation plate and the second liquid crystal phase retardation plate respectively and configured to control the action of applying same voltage signals to the first liquid crystal phase retardation plate and the second liquid crystal phase retardation plate when the LCD emits the first linearly polarized light, and control the action of applying opposite voltage signals to the first liquid crystal phase retardation plate and the second liquid crystal phase retardation plate when the LCD emits the second linearly polarized light.

Moreover, for instance, the analyzer may also include: a second liquid crystal phase retardation plate, a linear polarization sheet, a second quarter-wave phase retardation film disposed between the second liquid crystal phase retardation plate and the linear polarization sheet, and a control device; the linear polarization sheet is parallel to the polarization direction of the first linearly polarized light; the second liquid crystal phase retardation plate includes two substrates and a liquid crystal layer disposed between the two substrates; one surface of each substrate facing the liquid crystal layer is provided with a transparent electrode layer; the transparent electrode layer of each substrate of the second liquid crystal phase retardation plate is a planar electrode for covering a surface of the substrate; and the control device is in a signal communication with the LCD, the first liquid crystal phase retardation plate and the second liquid crystal phase retardation plate respectively and configured to control the action of applying opposite voltage signals to the first liquid crystal phase retardation plate and the second liquid crystal phase retardation plate when the LCD emits the first linearly polarized light, and control the action of applying same voltage signals to the first liquid crystal phase retardation plate and the second liquid crystal phase retardation plate when the LCD emits the second linearly polarized light.

Another aspect of the present invention provides a display device, which comprises: an LCD provided with a backlight and an LCD panel, a first quarter-wave phase retardation film disposed on one side of the LCD panel away from the backlight, and a first liquid crystal phase retardation plate disposed on one side of the first quarter-wave phase retardation film away from the LCD panel. The first liquid crystal phase retardation plate includes two substrates and a liquid crystal layer disposed between the two substrates; one surface of each substrate facing the liquid crystal layer is provided with a transparent electrode layer; the LCD emits, at an interval of row/column, first linearly polarized light for type I information and second linearly polarized light for type II information; the transparent electrode layer of one substrate of the first liquid crystal phase retardation plate is provided with a plurality of first strip electrodes corresponding to the row/column positions of the type I information and a plurality of second strip electrodes corresponding to the row/column positions of the type II information; the transparent electrode layer of the other substrate is a planar electrode for covering a surface of the substrate; and when a predetermined voltage signal is applied to the first strip electrodes and a voltage signal opposite to the predetermined voltage signal is applied to the second strip electrodes, the first liquid crystal phase retardation plate converts emergent light, passing through and emitted from the first quarter-wave phase retardation film, of the first linearly polarized light into circularly polarized light in the first rotation direction, and converts emergent light, passing through and emitted from the first quarter-wave phase retardation film, of the second linearly polarized light into circularly polarized light in the second rotation direction.

For instance, in the display device, patterns of the type I information and the type II information have close colors.

For instance, in the display device, the type I information may be a confidential pattern or a random mosaic pattern while correspondingly the type II information may be a random mosaic pattern or a confidential pattern.

Further another aspect of the present invention provides a display system, which comprises any foregoing display device and an analyzer for analyzing the circularly polarized light in the first rotation direction.

For instance, the analyzer may include: a second liquid crystal phase retardation plate, a linear polarization sheet, a second quarter-wave phase retardation film disposed between the second liquid crystal phase retardation plate and the linear polarization sheet, and a control device; the linear polarization sheet is perpendicular to the polarization direction of the firstly polarized light; the second liquid crystal phase retardation plate includes two substrates and a liquid crystal layer disposed between the two substrates; one surface of each substrate facing the liquid crystal layer is provided with a transparent electrode layer; the transparent electrode layer of one substrate of the second liquid crystal phase retardation plate is provided with a plurality of first strip electrodes corresponding to the row/column positions of the type I information and a plurality of second strip electrodes corresponding to the row/column positions of the type II information; the transparent electrode layer of the other substrate is a planar substrate for covering a surface of the substrate; and the control device is in a signal communication with the LCD, the first liquid crystal phase retardation plate and the second liquid crystal phase retardation plate respectively and configured to control the action of applying same voltage signals to the first strip electrodes of the first liquid crystal phase retardation plate and the first strip electrodes of the second liquid crystal phase retardation plate, and control the action of applying opposite voltage signals to the second strip electrodes of the first liquid crystal phase retardation plate and the second strip electrodes of the second liquid crystal phase retardation plate.

Moreover, for instance, the analyzer may also include: a second liquid crystal phase retardation plate, a linear polarization sheet and a second quarter-wave phase retardation film disposed between the second liquid crystal phase retardation plate and the linear polarization sheet, and a control device; the linear polarization sheet is parallel to the polarization direction of the first linearly polarized light; the second liquid crystal phase retardation plate includes two substrates and a liquid crystal layer disposed between the two substrates; one surface of each substrate facing the liquid crystal layer is provided with a transparent electrode layer; the transparent electrode layer of one substrate of the second liquid crystal phase retardation plate is provided with a plurality of first strip electrodes corresponding to the row/column positions of the type I information and a plurality of second strip electrodes corresponding to the row/column positions of the type II information; the transparent electrode layer of the other substrate is a planar electrode for covering a surface of the substrate; and the control device is in a signal communication with the LCD, the first liquid crystal phase retardation plate and the second liquid crystal phase retardation plate and configured to control the action of applying opposite voltage signals to the first strip electrodes of the first liquid crystal phase retardation plate and the first strip electrodes of the second liquid crystal phase retardation plate, and control the action of applying same voltage signals to the second strip electrodes of the first liquid crystal phase retardation plate and the second strip electrodes of the second liquid crystal phase retardation plate.

For instance, the analyzer may be a polarization analyzing eyewear.

In the embodiment of the present invention, as the first linearly polarized light for the type I information and the second linearly polarized light for the type II information, emitted from the LCD, are converted into overlapped light of circularly polarized light in two rotation directions after passing through the first quarter-wave phase retardation film and the first liquid crystal phase retardation plate and the overlapped state of the patterns of the type I information and the pattern of the type II information is displayed on the screen, the viewer cannot view effective image information on the screen in the case of glasses-free viewing. If one of the type I information and the type II information is confidential information, the confidential effect of the display device can be greatly improved by adoption of the display device provided by the present invention.

BRIEF DESCRIPTION OF THE DRAWINGS

Simple description will be given below to the accompanying drawings of the embodiments to provide a more clear understanding of the technical proposals of the embodiments of the present invention. It will be obvious to those skilled in the art that the drawings described below only involve some embodiments of the present invention but are not intended to limit the present invention.

REFERENCE NUMERALS

Figure 1A:
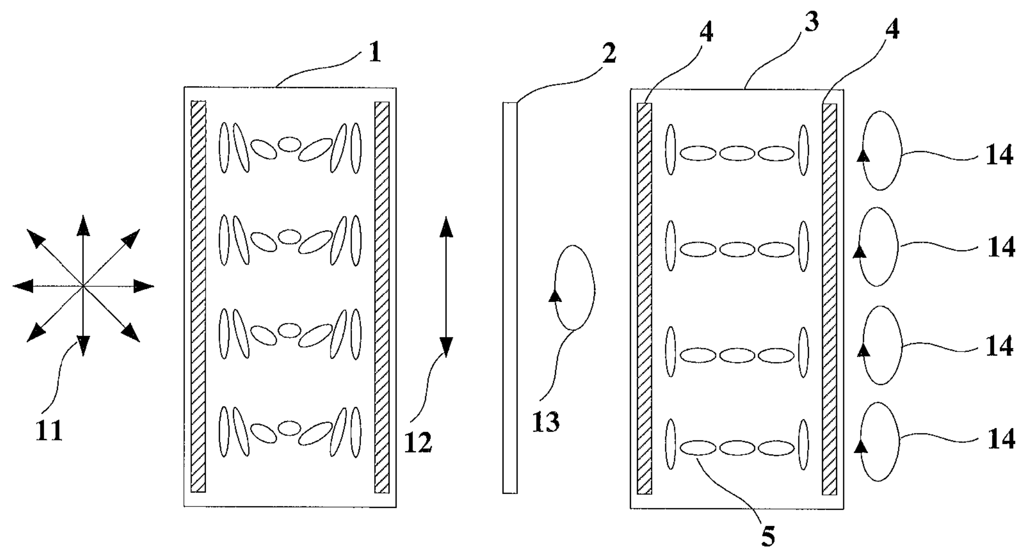
FIGS. 1*a* and 1*b* are respectively schematic diagrams of a first embodiment of the display device provided by the present invention, under different voltage states.

1—LCD Panel;
2—First Quarter-wave Phase Retardation Film;
3—First Liquid Crystal Phase Retardation Plate;
4—Substrate;
5—Liquid Crystal Layer;
6—Second Liquid Crystal Phase Retardation Plate;
7—Second Quarter-wave Phase Retardation Film;
8—Linear Polarization Sheet;
11—Light of Backlight;
12—Linearly Polarized Light;
13—Right-handed Circularly Polarized Light;
14—Right-handed Circularly Polarized Light;
15—Left-handed Circularly Polarized Light;
16—Linearly Polarized Light;
17—Linearly Polarized Light;
18—Linearly Polarized Light;
21—First Voltage Signal;
22—Second Voltage Signal.

DETAILED DESCRIPTION

For more clear understanding of the objectives, technical proposals and advantages of the embodiments of the present invention, clear and complete description will be given below to the technical proposals of the embodiments of the present invention with reference to the accompanying drawings of the embodiments of the present invention. It will be obvious to those skilled in the art that the preferred embodiments are only partial embodiments of the present invention but not all the embodiments. All the other embodiments obtained by those skilled in the art without creative efforts on the basis of the embodiments of the present invention illustrated shall fall within the scope of protection of the present invention.

Unless otherwise defined, the technical terms or scientific terms used herein have normal meanings understood by those skilled in the art. The words "first", "second" and the like used in the description and the claims of the patent application of the present invention do not indicate the sequence, the number or the importance but are only used for distinguishing different components. Similarly, the words "a", "an", "the" and the like also do not indicate the number but only indicate at least one. The word "comprise", "include" or the like only indicates that an element or a component before the word contains elements or components listed after the word and equivalents thereof; not excluding other elements or components. The words "connection", "connected" and the like are not limited to physical or mechanical connection but may include electrical connection, either directly or indirectly.

In order to improve the confidential effect of a display device, embodiments of the present invention provide a display device and display system. In the present invention, an LCD displays type I information and type II information; the light of a backlight is converted into linearly polarized light after passing through an LCD panel; the linearly polarized light is converted into left-handed circularly polarized light or right-handed circularly polarized light after passing through a first quarter-wave phase retardation film; and the left-handed circularly polarized light or the right-handed circularly polarized light is converted into left-handed circularly polarized light and right-handed circularly polarized light that are overlapped with each other after passing through a first liquid crystal phase retardation plate applied with a voltage. As the light not only including the left-handed circularly polarized light but also including the right-handed circularly polarized light cannot be identified by naked eyes, the effective information displayed on the screen cannot be identified. When a secret-related personnel adopts an analyzer for analyzing the left-handed circularly polarized light or the right-handed circularly polarized light, one type of information therein can be identified, and hence the confidential display effect can be improved.

In the following embodiments of the present invention, linearly polarized light refers to light that is polarized linearly; and circularly polarized light refers to light that is polarized circularly, has two rotation directions, and includes left-handed circularly polarized light and right-handed circularly polarized light, namely, the circularly polarized light in the first rotation direction and the circularly polarized light in the second rotation direction in the present disclosure.

Figure 1B:
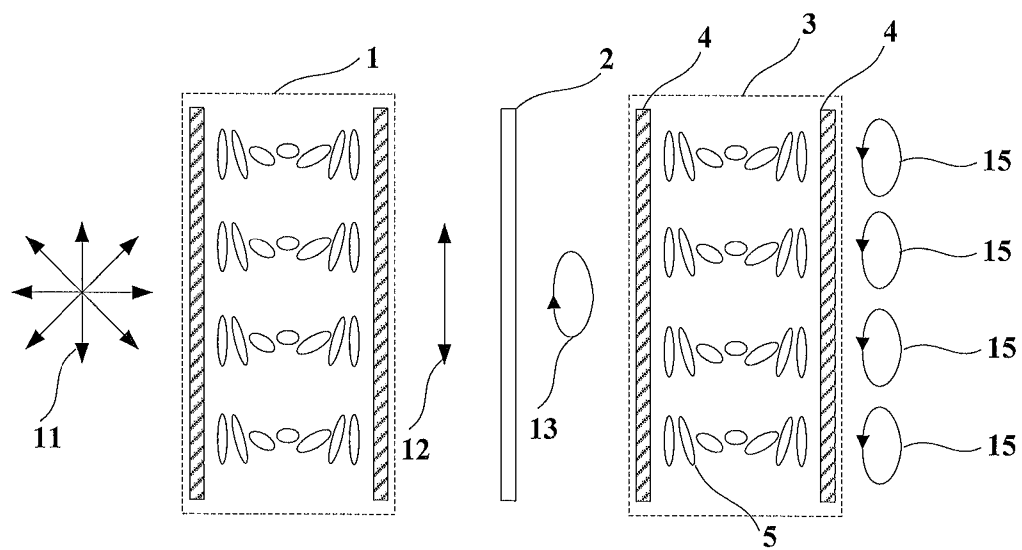

As illustrated in FIGS. 1*a* and 1*b* which are respectively schematic diagrams of a first embodiment of the display device provided by the present invention, under different voltage states, the display device comprises an LCD provided with a backlight (not illustrated in the figure) and an LCD panel 1, and further comprises: a first quarter-wave phase retardation film 2 disposed on one side of the LCD panel 1 away from the backlight, and a first liquid crystal phase retardation plate 3 disposed on one side of the first quarter-wave phase retardation film 2 away from the LCD panel 1. The first liquid crystal phase retardation plate 3 includes two substrates 4 and a liquid crystal layer 5 disposed between the two substrates 4; and one surface, facing the liquid crystal layer 5, of each substrate 4 is provided with a transparent electrode layer.

The LCD emits alternately second linearly polarized light of one frame of type II information and first linearly polarized light of one frame of type I information. The transparent electrode layer of each substrate 4 of the first liquid crystal phase retardation plate 3 is a planar electrode for covering a surface of the substrate.

When the LCD emits the first linearly polarized light, a predetermined voltage signal is applied to the first liquid crystal phase retardation plate 3 that is driven to convert emergent light, passing through and emitted from the first quarter-wave phase retardation film 2, of the first linearly polarized light into circularly polarized light in the first rotation direction. When the LCD emits the second linearly polarized light, a voltage signal opposite to the predetermined voltage signal is applied to the first liquid crystal phase retardation plate 3 that is driven to convert emergent light, passing through and emitted from the first quarter-wave phase retardation film 2, of the second linearly polarized light into circularly polarized light in the second rotation direction.

Figure 2:
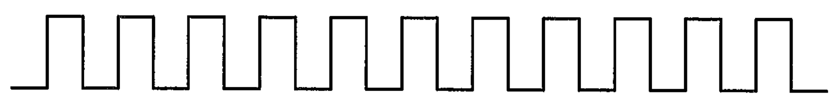
FIG. 2 is an oscillogram of a periodic voltage applied to a liquid crystal phase retardation plate in the first embodiment of the display device provided by the present invention.

In the technical proposal of the embodiment, as illustrated in FIG. 1*a* which is an optical path diagram of one frame of type I information displayed by the LCD panel, the light of a backlight 11 is converted into linearly polarized light 12 after passing through the LCD panel 1; and O light (ordinary light) and E light (extraordinary light) of the linearly polarized light 12 are driven to produce 3π/2 or π/2 phase retardation and converted into left-handed circularly polarized light or right-handed circularly polarized light after passing through the first quarter-wave phase retardation film 2. When a predetermined voltage signal is applied across the planar electrodes of the first liquid crystal phase retardation plate 3, the predetermined voltage may preferably be a periodic voltage; during the high voltage state of the periodic voltage, the alignment of liquid crystal molecules is parallel to the propagation direction of incident light and the rotation direction of the circularly polarized light is not changed; and during the low voltage stage of the periodic voltage, the alignment of the liquid crystal molecules is deflected and the rotation direction of the circularly polarized light is overturned. For instance, the period of the periodic voltage is equal to an integral multiple of the frame period of the LCD panel. For instance, a synchronizer may also be provided for realizing the synchronization of both. Description is given here only by taking as an example the case that the light emitted from the first quarter-wave phase retardation film is the right-handed circularly polarized light 13. In this case, the periodic voltage applied to the first liquid crystal phase retardation plate 3 is as illustrated by high voltage in FIG. 2. At this point, the liquid crystal molecules in the first liquid crystal phase retardation plate 3 are perpendicular to the substrates, namely the alignment of the liquid crystal molecules is the same as the propagation direction of the incident right-handed circularly polarized light 13. Therefore, the rotation direction of the circularly polarized light emitted from the first liquid crystal phase retardation plate 3 is not changed and is still the right-handed circularly polarized light 14.

As illustrated in FIG. 1*b* which is an optical path diagram of one frame of interference information displayed by the LCD panel, the light of backlight 11 is converted into linearly polarized light 12 after passing through the LCD panel 1; and the linearly polarized light 12 is converted into left-handed circularly polarized light or right-handed circularly polarized light after passing through the first quarter-wave phase retardation film 2. Description is given here only by taking as an example the case that the light emitted from the first quarter-wave phase retardation film is the right-handed circularly polarized light 13. In this case, the periodic voltage applied to the liquid crystal phase retardation plate 3 is as illustrated by low voltage in FIG. 2. The low voltage may also refer to the case of no voltage being applied, namely the voltage value is zero. At this point, the alignment of the liquid crystal molecules in the first liquid crystal phase retardation plate 3 is deflected and the liquid crystal molecules are equivalent to a half-wave phase retardation film. Therefore, the rotation direction of the circularly polarized light emitted from the first liquid crystal phase retardation plate 3 is changed, namely the circularly polarized light is converted into left-handed circularly polarized light 15.

Therefore, as the time for displaying each frame is very short and the human eye has the phenomenon of persistence of vision, the viewer receives overlapped light of the left-handed circularly polarized light and the right-handed circularly polarized light, namely an overlapped pattern of the type I information and the type II information, and hence cannot normally read the content on the display screen. Of course, in the proposal, the high voltage and the low voltage applied to the liquid crystal phase retardation plate, corresponding to the type I information and the type II information, may be exchanged as long as the rotation direction of the circularly polarized light, emitted from the liquid crystal phase retardation plate, corresponding to the type I information and the type II information displayed at an interval of frame is different. In the embodiment of the present invention, the following cases can be displayed on the LCD: a plurality of frames of type II information are displayed and then one frame of type I information is inserted; one frame of type II information is displayed and then one frame of type I information is inserted; or one frame of type II information is displayed and then a plurality of frames of type I information are inserted.

Figure 3A:
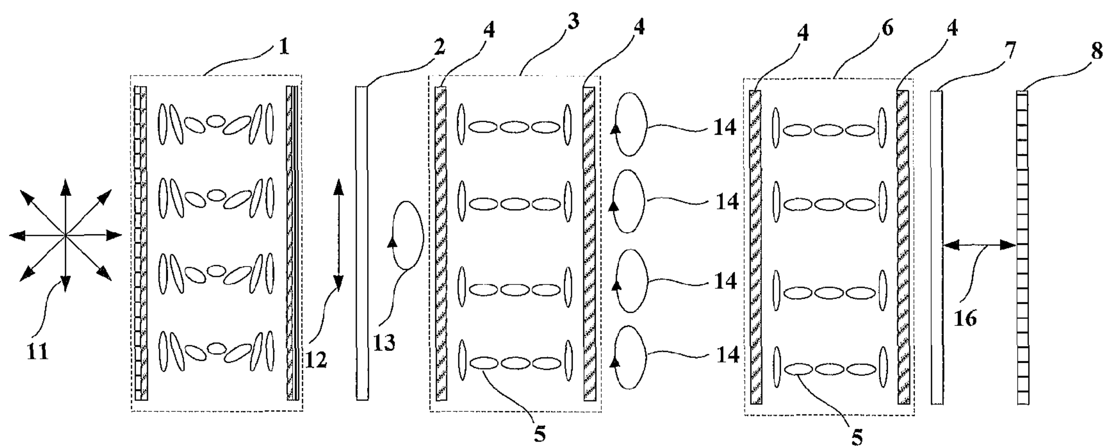
FIGS. 3*a* and 3*b* are respectively schematic diagrams of a first embodiment of the display system provided by the present invention, under different voltage states.
Figure 3B:
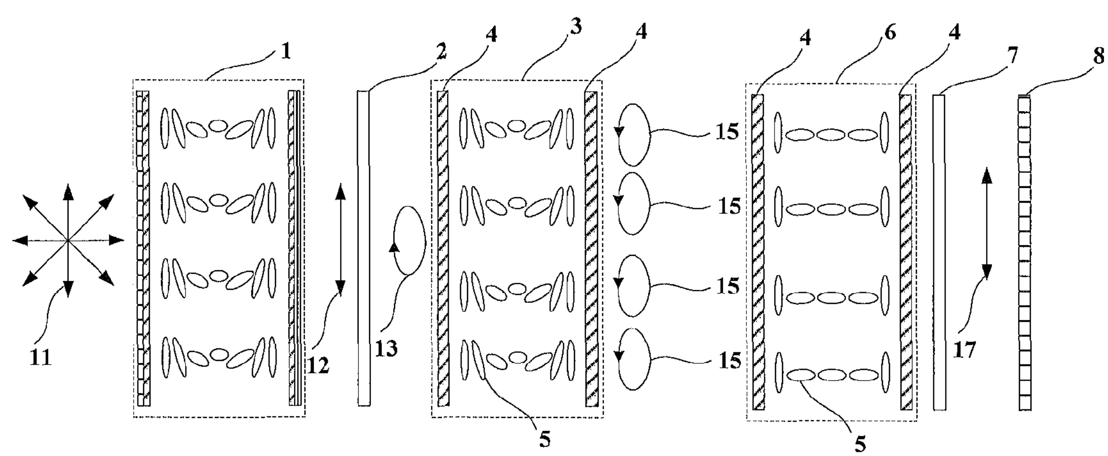

An embodiment of the present invention further provides a display system. As illustrated in FIG. 3*a* or 3*b*, a first embodiment of the display system comprises any one of the foregoing display devices and an analyzer for analyzing the circularly polarized light in the first rotation direction. The analyzer includes: a second liquid crystal phase retardation plate 6, a linear polarization sheet 8, and a second quarter-wave phase retardation film 7 disposed between the second liquid crystal phase retardation plate 6 and the linear polarization sheet 8. A transmission axis of the linear polarization sheet 8 is perpendicular to the polarization direction of the first linearly polarized light 12. The second liquid crystal phase retardation plate 6 includes two substrates 4 and a liquid crystal layer 5 disposed between the two substrates 4. One surface of each substrate 4 facing the liquid crystal layer 5 is provided with a transparent electrode layer; and the transparent electrode layer of each substrate 4 of the second liquid crystal phase retardation plate 6 is a planar electrode for covering a surface of the substrate.

The display system further comprises a control device. The control device is in a signal communication with the LCD, the first liquid crystal phase retardation plate 3 and the second liquid crystal phase retardation plate 6 and configured to control the action of applying same voltage signals to the first liquid crystal phase retardation plate 3 and the second liquid crystal phase retardation plate 6 when the LCD emits the first linearly polarized light, and control the action of applying opposite voltage signals to the first liquid crystal phase retardation plate 3 and the second liquid crystal phase retardation plate 6 when the LCD emits the second linearly polarized light. For instance, the control device may be realized with a general or special computing device (e.g., central processing unit (CPU) and digital signal processor (DSP)).

In the display system provided by the embodiment, as illustrated in FIG. 3*a*, when the LCD emits the first linearly polarized of the type I information, the first linearly polarized light is converted into right-handed circularly polarized light 14 after passing through the first quarter-wave phase retardation film 2 and the first liquid crystal phase retardation plate 3; at this point, a voltage signal applied to the second liquid crystal phase retardation plate 6 is the same as a voltage signal applied to the first liquid crystal phase retardation plate 3; the right-handed circularly polarized light 14 is converted into linearly polarized light 16, of which the polarization direction is perpendicular to that of the first linearly polarized light, after passing through the second liquid crystal phase retardation plate 6 and the second quarter-wave phase retardation film 7; and at this point, the light may pass through the linear polarization sheet 8. If the type I information is confidential information, the secret-related personnel can view the confidential information through the analyzer.

As illustrated in FIG. 3*b*, when the LCD emits the second linearly polarized light of the type II information, the second linearly polarized light is converted into left-handed circularly polarized light 15 after passing through the first quarter-wave phase retardation film 2 and the first liquid crystal phase retardation plate 3; at this point, a voltage signal applied to the second liquid crystal phase retardation plate 6 is opposite to a voltage signal applied to the first liquid crystal phase retardation plate 3; the left-handed circularly polarized light 15 is converted into linearly polarized light 17, of which the polarization direction is parallel to that of the second linearly polarized light, after passing through the second liquid crystal phase retardation plate 6 and the second quarter-wave phase retardation film 7; and at this point, the light cannot pass through the linear polarization sheet 8, and hence the secret-related personnel cannot view the type II information through the analyzer, namely the secret-related personnel can only view the type I information and cannot view the type II information. At this point, the type I information is defined as confidential information, and hence the secret-related personnel can view the effective information, but non-secret-related personnel without the analyzer can only view the overlapped light of the right-handed circularly polarized light and the left-handed circularly polarized light and hence cannot identify the effective information.

An embodiment of the present invention further provides another display system, which comprises any one of foregoing display devices and an analyzer for analyzing the circularly polarized light in the first rotation direction. The analyzer includes: a second liquid crystal phase retardation plate, a linear polarization sheet, and a second quarter-wave phase retardation film disposed between the second liquid crystal phase retardation plate and the linear polarization sheet. The linear polarization sheet is parallel to the polarization direction of the first linearly polarized light. The second liquid crystal phase retardation plate includes two substrates and a liquid crystal layer disposed between the two substrates; one surface of each substrate facing the liquid crystal layer is provided with a transparent electrode layer; and the transparent electrode layer of each substrate of the second liquid crystal phase retardation plate is a planar electrode for covering a surface of the substrate.

The display system further comprises a control device. The control device is in a signal communication with the LCD, the first liquid crystal phase retardation plate and the second liquid crystal phase retardation plate respectively and configured to control the action of applying opposite voltage signals to the first liquid crystal phase retardation plate and the second liquid crystal phase retardation plate when the LCD emits the first linearly polarized light, and control the action of applying same voltage signals to the first liquid crystal phase retardation plate and the second liquid crystal phase retardation plate when the LCD emits the second linearly polarized light. For instance, the control device may be achieved by a general or special computing device (e.g., CPU and DSP).

The difference between the display system provided by this embodiment and the display system provided by the first embodiment is as follows: the polarization directions of the linearly polarized light are perpendicular to each other, and opposite voltage signals are applied to the second liquid crystal phase retardation plate. In the embodiment, the secret-related personnel having the analyzer can view the type II information but cannot view the type I information; at this point, the type II information is defined as confidential information; and the non-secret-related personnel without the analyzer still views the overlapped state of the type I information and the type II information and hence cannot identify effective information.

In the embodiments of the display system provided by the present invention, the analyzer cooperating with the display device are provided, and carried by the groups required to view the confidential information so that the groups can view the confidential information. The analyzer should be consistent with the polarization state of the emergent light corresponding to the confidential information. For instance, if the emergent light corresponding to the confidential information is right-handed circularly polarized light, a right-handed circular polarization analyzer is arranged. The analyzer may be of various configurations, and for instance, a polarization analyzing eyewear with a handle may be adopted as long as the human eye can view the screen of the display device through the polarization analyzing eyewear.

Figure 4A:
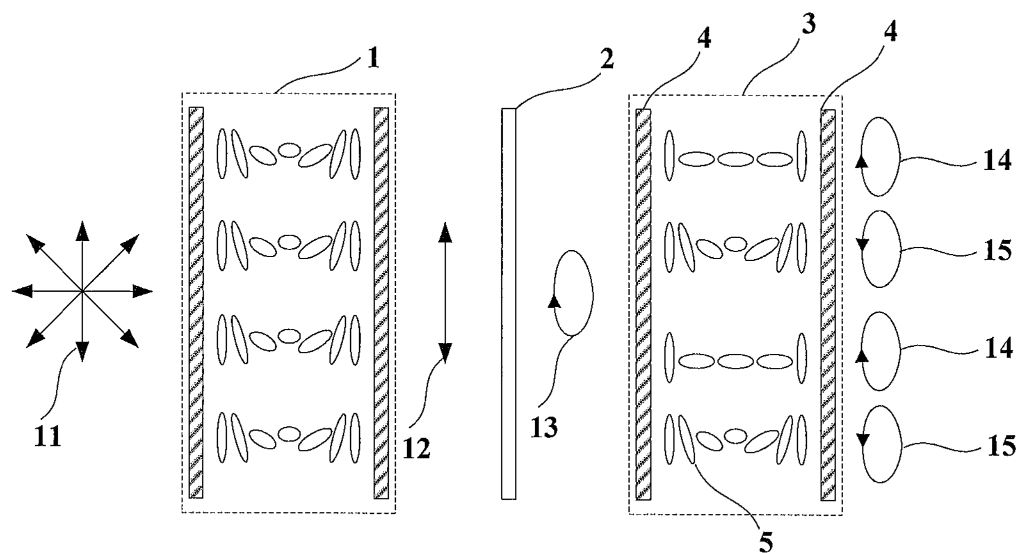
FIG. 4*a* is a schematic structural view of a second embodiment of the display device provided by the present invention.
Figure 4B:
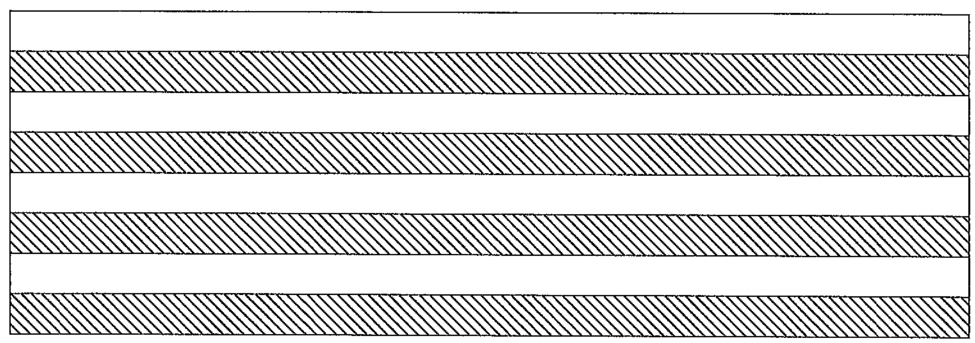
FIG. 4*b* is a schematic diagram of parallel strip electrodes.

As illustrated in FIG. 4*a*, a display device provided by a second embodiment of the present invention comprises an LCD provided with a backlight (not illustrated in the figure) and an LCD panel 1, and further comprises: a first quarter-wave phase retardation film 2 disposed on one side of the LCD panel 1 away from the backlight, and a first liquid crystal phase retardation plate 3 arranged on one side of the first quarter-wave phase retardation film 2 away from the LCD panel 1. The first liquid crystal phase retardation plate 3 includes two substrates 4 and a liquid crystal layer 5 disposed between the two substrates 4; and one surface, facing the liquid crystal layer 5, of each substrate 4 is provided with a transparent electrode layer. The LCD emits, at an interval of row/column, first linearly polarized light for type I information and second linearly polarized light for type II information; the transparent electrode layer of one substrate of the first liquid crystal phase retardation plate 3 is provided with a plurality of first strip electrodes corresponding to the row/column positions of the type I information and a plurality of second strip electrodes corresponding to the row/column positions of the type II information; and the transparent electrode layer of the other substrate is a planar electrode for covering a surface of the substrate. The plurality of first strip electrodes are, for instance, parallel to each other and distributed at a certain distance; and the plurality of second strip electrodes are, for instance, parallel to each other and distributed at a certain distance. As illustrated in FIG. 4*b*, hatched portions represent the voltage of the strip electrodes formed in parallel.

When a predetermined voltage signal is applied to the first strip electrodes and a voltage signal opposite to the predetermined voltage signal is applied to the second strip electrodes, the first liquid crystal phase retardation plate 3 converts the first linearly polarized light, passing through and emitted from the first quarter-wave phase retardation film 2, into circularly polarized light in the first rotation direction, and converts the second linearly polarized light, passing through and emitted from the first quarter-wave phase retardation film 2, into circularly polarized light in the second rotation direction.

In the embodiment, the light from the backlight 11 (generally equivalent to the natural light) is converted into linearly polarized light 12 after passing through the LCD panel 1; and the linearly polarized light 12 is converted into left-handed circularly polarized light or right-handed circularly polarized light after passing through the first quarter-wave phase retardation film 2. When a predetermined voltage signal is applied to the first strip electrodes of the first liquid crystal phase retardation plate 3, if the voltage is high voltage, the alignment of liquid crystal molecules in row/columns corresponding to the type I information is parallel to the propagation direction of incident light, and the rotation direction of the circularly polarized light is not changed; and when a voltage signal opposite to the predetermined voltage signal is applied to the second strip electrodes of the first liquid crystal phase retardation plate 3, if the voltage is low voltage, the alignment of the liquid crystal molecules is deflected and the rotation direction of the circularly polarized light is overturned. Description is given here only by taking as an example the case that the light emitted from the first quarter-wave phase retardation film is the right-handed circularly polarized light and the type I information and the type II information are displayed in rows.

Figure 5:
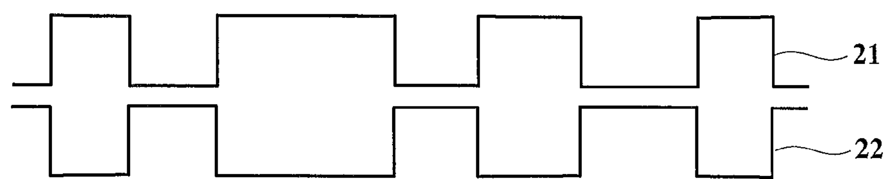
FIG. 5 is an oscillogram of a voltage applied to a liquid crystal phase retardation plate in the second embodiment of the display device provided by the present invention.

The rows for displaying the type I information in the LCD correspond to the first strip electrodes of the substrate in the first liquid crystal phase retardation plate 3. A predetermined voltage signal is applied to the first strip electrodes, and the waveform of the applied voltage signal is as illustrated by a first voltage signal 21 in FIG. 5. The alignment of the liquid crystal molecules in the rows of the liquid crystal layer 5, corresponding to the type I information, is parallel to the propagation direction of right-handed circularly polarized light 13. Therefore, the rotation direction of the right-handed circularly polarized light 13 in the rows corresponding to the first strip electrodes is not changed, and the light emitted from a first liquid crystal cell 3 is still right-handed circularly polarized light 14. The rows for displaying the type II information correspond to the second strip electrodes of the substrate in the first liquid crystal phase retardation plate 3. A voltage signal opposite to the predetermined voltage signal, e.g., a second voltage signal 22 in FIG. 5, is applied to the second strip electrodes. At this point, the liquid crystal molecules corresponding to the second strip electrodes is deflected, and the liquid crystal layer functions a half-wave phase retardation film, so that the right-handed circularly polarized light 13 entering the first liquid crystal phase retardation plate 3 can be converted into left-handed circularly polarized light 15. Therefore, the overlapped light of the right-handed circularly polarized light 14 and the left-handed circularly polarized light 15 is viewed by the viewer and hence cannot be identified by naked eyes.

The display device provided by the present invention is not limited to the above-mentioned two embodiments as long as the first linearly polarized light and the second linearly polarized light are converted into circularly polarized light in different rotation directions after passing through the first quarter-wave phase retardation film and the first liquid crystal phase retardation plate applied with a voltage. In the first embodiment, the type I information and the type II information are respectively displayed at an interval of one frame and may also be displayed at an interval of two or more frames as long as the human eye cannot identify the information within the time of a plurality of scanning frames. In the second embodiment, the type I information and the type II information not only may be respectively displayed at an interval of row but also may be displayed at an interval of column, may also be displayed at an interval of two rows or two columns or at an interval of a plurality of rows or a plurality of columns, and may also adopt the way in which one subpixel corresponds to two small rows, with one row displaying the type I information and the other row displaying the type II information. If the type I information and the type II information are respectively displayed at an interval of column, the transparent strip electrodes of corresponding liquid crystal phase retardation plate are disposed at corresponding columns of the type I information of the substrate. Therefore, a plurality of embodiments may be obtained according to the design concept of the present invention. In the technical proposals of the embodiments, the emergent light emitted from the liquid crystal phase retardation plate is the overlapped light of the left-handed circularly polarized light and the right-handed circularly polarized light and cannot be identified by naked eyes, so that the confidential display effect can be improved.

Figure 6:
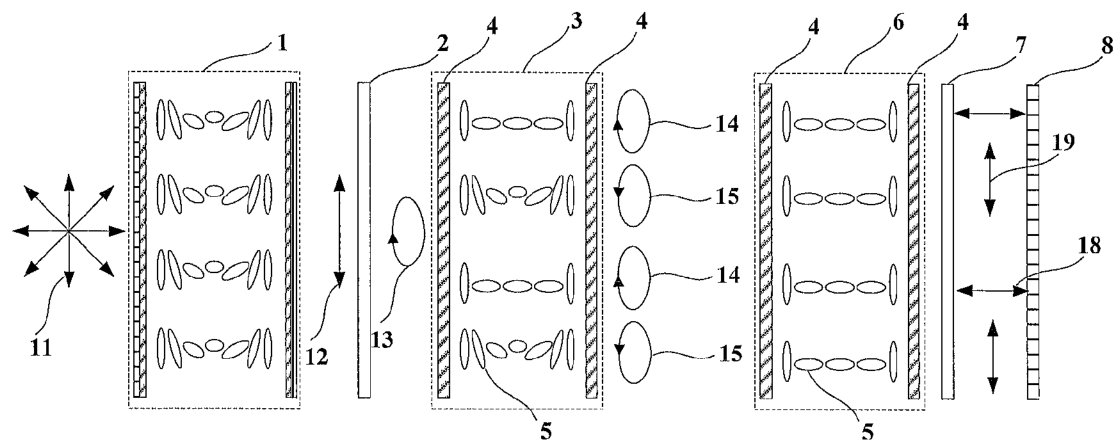
FIG. 6 is a schematic structural view of a second embodiment of the display system provided by the present invention.

An embodiment of the present invention provides a display system. As illustrated in FIG. 6, a second embodiment of the display system provided by the present invention comprises the display device provided by the second embodiment and an analyzer for analyzing the circularly polarized light in the first rotation direction. The analyzer includes: a second liquid crystal phase retardation plate 6, a linear polarization sheet 8, and a second quarter-wave phase retardation film 7 disposed between the second liquid crystal phase retardation plate 6 and the linear polarization sheet 8. The linear polarization sheet 8 is perpendicular to the polarization direction of the first linearly polarized light. The second liquid crystal phase retardation plate 6 includes two substrates 4 and a liquid crystal layer 5 disposed between the two substrates 4; one surface of each substrate 4 facing the liquid crystal layer 5 is provided with a transparent electrode layer; the transparent electrode layer of one substrate 4 of the second liquid crystal phase retardation plate 6 is provided with a plurality of first strip electrodes corresponding to the row/column positions of the type I information and a plurality of second strip electrodes corresponding to the row/column positions of the type II information; and the transparent electrode layer of the other substrate 4 is a planar electrode for covering a surface of the substrate.

The display system provided by the embodiment further comprises a control device. The control device is in a signal communication with the LCD, the first liquid crystal phase retardation plate 3 and the second liquid crystal phase retardation plate 6 respectively and configured to control the action of applying same voltage signals to the first strip electrodes of the first liquid crystal phase retardation plate 3 and the first strip electrodes of the second liquid crystal phase retardation plate 6, and control the action of applying opposite voltage signals to the second strip electrodes of the first liquid crystal phase retardation plate 3 and the second strip electrodes of the second liquid crystal phase retardation plate 6. For instance, the control device may be achieved by a general or special computing device (e.g., CPU and DSP).

In the display system provided by the present embodiment, when the first linearly polarized light of the type I information is emitted from certain rows/columns of the LCD, the first linearly polarized light is converted into right-handed circularly polarized light 14 after passing through the first quarter-wave phase retardation film 2 and the first liquid crystal retardation plate 3; at this point, a voltage signal applied to the first strip electrodes of the second liquid crystal phase retardation plate 6 is the same as a voltage signal applied to the first strip electrodes of the first liquid crystal phase retardation plate 3; the right-handed circularly polarized light 14 is converted into linearly polarized light 18, of which the polarization direction is perpendicular to that of the first linearly polarized light, after passing through the second liquid crystal phase retardation plate 6 and the second quarter-wave phase retardation film 7; and at this point, the light may pass through the linear polarization sheet 8. If the type I information is confidential information, the secret-related personnel could view the confidential information with the analyzer.

When the LCD emits the second linearly polarized light of the type II information, the first linearly polarized light is converted into left-handed circularly polarized light 15 after passing through the first quarter-wave phase retardation film 2 and the first liquid crystal phase retardation plate 3; at this point, a voltage signal applied to the second strip electrodes of the second liquid crystal phase retardation plate 6 is opposite to a voltage signal applied to the second strip electrodes of the first liquid crystal phase retardation plate 3; the left-handed circularly polarized light 15 is converted into linearly polarized light 19, of which the polarization direction is parallel to that of the second linearly polarized light, after passing through the second liquid crystal phase retardation plate 6 and the second quarter-wave phase retardation film 7; and at this point, the light cannot pass through the linear polarization sheet 8, so that the secret-related personnel cannot view the type II information with the analyzer, namely the secret-related personnel can only view the type I information and cannot view the type II information. At this point, the type I information is defined as confidential information, and hence the secret-related personnel can view effective information; but the non-secret-related personnel without the analyzer views the overlapped light of the right-handed circularly polarized light and the left-handed circularly polarized light and hence cannot identify the effective information.

The embodiment of the present invention further provides a display system, which comprises the display device provided by the second embodiment and an analyzer for analyzing the circularly polarized light in the first rotation direction. The analyzer includes: a second liquid crystal phase retardation plate, a linear polarization sheet, and a second quarter-wave phase retardation film disposed between the second liquid crystal phase retardation plate and the linear polarization sheet; the linear polarization sheet is parallel to the polarization direction of the first linearly polarized light; the second liquid crystal phase retardation plate includes two substrates and a liquid crystal layer disposed between the two substrates; one surface of each substrate facing the liquid crystal layer is provided with a transparent electrode layer; the transparent electrode layer of one substrate of the second liquid crystal phase retardation plate is provided with a plurality of first strip electrodes corresponding to the row/column positions of the type I information and a plurality of second strip electrodes corresponding to the row/column positions of the type II information; and the transparent electrode layer of the other substrate is a planar electrode for covering a surface of the substrate.

The display system provided by the embodiment further comprises a control device. The control device is in a signal communication with the LCD, the first liquid crystal phase retardation plate and the second liquid crystal phase retardation plate respectively, and configured to control the action of applying opposite voltage signals to the first strip electrodes of the first liquid crystal phase retardation plate and the first strip electrodes of the second liquid crystal phase retardation plate, and control the action of applying same voltage signals to the second strip electrodes of the first liquid crystal phase retardation plate and the second strip electrodes of the second liquid crystal phase retardation plate. For instance, the control device may be achieved by a general or special computing device (e.g., CPU and DSP).

The difference between the display system provided by the embodiment and the display system provided by the second embodiment is as follows: the linear polarization sheet is parallel to the polarization direction of the first linearly polarized light; opposite voltage signals are applied to the first strip electrodes of the first liquid crystal phase retardation plate and the first strip electrodes of the second liquid crystal phase retardation plate; and same voltage signals are applied to the second strip electrodes of the first liquid crystal phase retardation plate and the second strip electrodes of the second liquid crystal phase retardation plate. In the embodiment, the secret-related personnel with the analyzer can view the type II information but cannot view the type I information; at this point, the type II information is defined as confidential information; but the non-secret-related personnel without the analyzer still views the overlapped state of the type I information and the type II information and hence cannot identify effective information.

For instance, patterns of the type I information and the type II information in all the embodiments have close colors.

In the embodiments of the present invention, if the type I information is confidential information and the type II information is interference information, the pattern of the interference information may be properly selected; and in principle, a pattern of which the color is similar or close to that of a pattern of the confidential information can be selected so that good interference effect can be obtained. In the case of large difference between colors of the confidential pattern and the interference pattern due to inappropriate selection, the naked eye viewer may still view the confidential information.

For instance, the type I information is of a confidential pattern or a random mosaic pattern, and correspondingly, the type II information is of a random mosaic pattern or a confidential pattern.

In the embodiment provided by the present invention, the pattern of the interference information may have various arrangements. Preferably, the random mosaic pattern is selected. The mosaic pattern has good confusing effect and is applicable to be the interference information.

At present, main display modes of the display device are twisted nematic (TN) mode, vertical alignment (VA) mode, in-plane-switching (IPS) mode and advanced super dimension switch (AD-SDS, also referred to as ADS) mode and optically compensated bend (OCB) mode. The OCB mode is widely applied due to the advantages of improved viewing angle and high response speed. In the embodiments of the present invention, all the liquid crystal phase retardation plates may adopt the above display modes, but the liquid crystal phase retardation plates with the OCB mode are adopted preferably.

For instance, the analyzer may be a polarization analyzing eyewear (glasses).

In the embodiment of the present invention, in order for more conveniently using the analyzer, the analyzer may be designed as a polarization analyzing eyewear so that the viewer can conveniently view the confidential information in the display device by wearing the polarization analyzing eyewear.

The foregoing is only the preferred embodiments of the present invention and not intended to limit the scope of protection of the present invention. The scope of protection of the present invention should be defined by the appended claims.

The invention claimed is:

1. A display system, comprising a display device and an analyzer for analyzing a circularly polarized light in a first rotation direction, wherein the display device comprises:

a liquid crystal display (LCD) provided with a backlight and an LCD panel, a first quarter-wave phase retardation film disposed on one side of the LCD panel away from the backlight, and a first liquid crystal phase retardation plate disposed on one side of the first quarter-wave phase retardation film away from the LCD panel, wherein the first liquid crystal phase retardation plate includes two substrates and a liquid crystal layer disposed between the two substrates; one surface of each substrate facing the liquid crystal layer is provided with a transparent electrode layer;

the LCD alternately emits second linearly polarized light of one frame of type II information and first linearly polarized light of one frame of type I information, the type II information is interference information for the type I information, and the type I information cannot be substantially identified when the type I information and the type II information are overlapped; the transparent electrode layer of each substrate of the first liquid crystal phase retardation plate is a planar electrode for covering a surface of the substrate;

when the LCD emits the first linearly polarized light, a predetermined voltage signal is applied to the first liquid crystal phase retardation plate which is driven to convert emergent light, passing through and emitted from the first quarter-wave phase retardation film, of the first linearly polarized light into circularly polarized light in a first rotation direction; and when the LCD emits the second linearly polarized light, a voltage signal opposite to the predetermined voltage signal is applied to the first liquid crystal phase retardation plate which is driven to convert emergent light, passing through and emitted from the first quarter-wave phase retardation film, of the second linearly polarized light into circularly polarized light in a second rotation direction, wherein the analyzer includes:

a second liquid crystal phase retardation plate, a linear polarization sheet, a second quarter-wave phase retardation film disposed between the second liquid crystal phase retardation plate and the linear polarization sheet, and a control device; the linear polarization sheet is perpendicular to a polarization direction of the first linearly polarized light; the second liquid crystal phase retardation plate includes two substrates and a liquid crystal layer disposed between the two substrates; one surface of each substrate facing the liquid crystal layer is provided with a transparent electrode layer; the transparent electrode layer of each substrate of the second liquid crystal phase retardation plate is a planar electrode for covering a surface of the substrate; and the control device is in a signal communication with the LCD, the first liquid crystal phase retardation plate, and the second liquid crystal phase retardation plate respectively, and configured to control action of applying same voltage signals to the first liquid crystal phase retardation plate and the second liquid crystal phase retardation plate when the LCD emits the first linearly polarized light, and control action of applying opposite voltage signals to the first liquid crystal phase retardation plate and the second liquid crystal phase retardation plate when the LCD emits the second linearly polarized light, or, the analyzer includes:

a second liquid crystal phase retardation plate, a linear polarization sheet, a second quarter-wave phase retardation film disposed between the second liquid crystal phase retardation plate and the linear polarization sheet, and a control device; the linear polarization sheet is parallel to a polarization direction of the first linearly polarized light; the second liquid crystal phase retardation plate includes two substrates and a liquid crystal layer disposed between the two substrates; one surface of each substrate facing the liquid crystal layer is provided with a transparent electrode layer; the transparent electrode layer of each substrate of the second liquid crystal phase retardation plate is a planar electrode for covering a surface of the substrate; and the control device is in a signal communication with the LCD, the first liquid crystal phase retardation plate, and the second liquid crystal phase retardation plate respectively, and configured to control the action of applying opposite voltage signals to the first liquid crystal phase retardation plate and the second liquid crystal phase retardation plate when the LCD emits the first linearly polarized light, and control the action of applying same voltage signals to the first liquid crystal phase retardation plate and the second liquid crystal phase retardation plate when the LCD emits the second linearly polarized light.

2. The display device according to claim 1, wherein the type I information is a confidential pattern or a random mosaic pattern while the type II information is a random mosaic pattern or a confidential pattern.

3. The display system according to claim 1, wherein patterns of the type I information and the type II information have close colors.

4. A display system, comprising a display device and an analyzer for analyzing a circularly polarized light in a first rotation direction, wherein the display device comprises:

an LCD provided with a backlight and an LCD panel, a first quarter-wave phase retardation film disposed on one side of the LCD panel away from the backlight, and a first liquid crystal phase retardation plate disposed on one side of the first quarter-wave phase retardation film away from the LCD panel, wherein the first liquid crystal phase retardation plate includes two substrates and a liquid crystal layer disposed between the two substrates; one surface of each substrate facing the liquid crystal layer is provided with a transparent electrode layer;

the LCD emits, at an interval of row/column, first linearly polarized light for type I information and second linearly polarized light for type II information, the type II information is interference information for the type I information, and the type I information cannot be substantially identified when the type I information and the type II information are overlapped; the transparent electrode layer of one substrate of the first liquid crystal phase retardation plate is provided with a plurality of first strip electrodes corresponding to row/column positions of the type I information and a plurality of second strip electrodes corresponding to row/column positions of the type II information; the transparent electrode layer of the other substrate is a planar electrode for covering a surface of the substrate; and when a predetermined voltage signal is applied to the first strip electrodes and a voltage signal opposite to the predetermined voltage signal is applied to the second strip electrodes, the first liquid crystal phase retardation plate converts emergent light, passing through and emitted from the first quarter-wave phase retardation film, of the first linearly polarized light into circularly polarized light in the first rotation direction, and converts emergent light, passing through and emitted from the first quarter-wave phase retardation film, of the second linearly polarized light into circularly polarized light in the second rotation direction, wherein the analyzer includes:

a second liquid crystal phase retardation plate, a linear polarization sheet, a second quarter-wave phase retardation film disposed between the second liquid crystal phase retardation plate and the linear polarization sheet, and a control device; the linear polarization sheet is perpendicular to a polarization direction of the firstly polarized light; the second liquid crystal phase retardation plate includes two substrates and a liquid crystal layer disposed between the two substrates; one surface of each substrate facing the liquid crystal layer is provided with a transparent electrode layer; the transparent electrode layer of one substrate of the second liquid crystal phase retardation plate is provided with a plurality of first strip electrodes corresponding to row/column positions of the type I information and a plurality of second strip electrodes corresponding to row/column positions of the type II information; the transparent electrode layer of the other substrate is a planar substrate for covering a surface of the substrate; and the control device is in a signal communication with the LCD, the first liquid crystal phase retardation plate, and the second liquid crystal phase retardation plate respectively, and configured to control action of applying same voltage signals to the first strip electrodes of the first liquid crystal phase retardation plate and the first strip electrodes of the second liquid crystal phase retardation plate, and control action of applying opposite voltage signals to the second strip electrodes of the first liquid crystal phase retardation plate and the second strip electrodes of the second liquid crystal phase retardation plate, or the analyzer includes:

a second liquid crystal phase retardation plate, a linear polarization sheet, a second quarter-wave phase retardation film disposed between the second liquid crystal phase retardation plate and the linear polarization sheet, and a control device; the linear polarization sheet is parallel to a polarization direction of the first linearly polarized light; the second liquid crystal phase retardation plate includes two substrates and a liquid crystal layer disposed between the two substrates; one surface of each substrate facing the liquid crystal layer is provided with a transparent electrode layer; the transparent electrode layer of one substrate of the second liquid crystal phase retardation plate is provided with a plurality of first strip electrodes corresponding to row/column positions of the type I information and a plurality of second strip electrodes corresponding to row/column positions of the type II information; the transparent electrode layer of the other substrate is a planar electrode for covering a surface of the substrate; and the control device is in a signal communication with the LCD, the first liquid crystal phase retardation plate, and the second liquid crystal phase retardation plate, and configured to control action of applying opposite voltage signals to the first strip electrodes of the first liquid crystal phase retardation plate and the first strip electrodes of the second liquid crystal phase retardation plate, and control action of applying same voltage signals to the second strip electrodes of the first liquid crystal phase retardation plate and the second strip electrodes of the second liquid crystal phase retardation plate.

5. The display device according to claim 4, wherein the type I information is a confidential pattern or a random mosaic pattern while the type II information is a random mosaic pattern or a confidential pattern.

6. The display system according to claim 4, wherein patterns of the type I information and the type II information have close colors.

* * * * *